United States Patent
Viaux et al.

(10) Patent No.: US 11,097,329 B2
(45) Date of Patent: *Aug. 24, 2021

(54) METHOD FOR PRODUCING AN INNER AUTOMOTIVE STRUCTURAL PART COMPRISING LOCALIZED REINFORCED AREAS

(71) Applicant: ArcelorMittal, Luxembourg (LU)

(72) Inventors: Ivan Viaux, Paris (FR); Ives Drouadaine, Pontoise (FR)

(73) Assignee: ARCELORMITTAL, Luxembourg (LU)

( * ) Notice: Subject to any disclaimer, the term of this patent is extended or adjusted under 35 U.S.C. 154(b) by 276 days.

This patent is subject to a terminal disclaimer.

(21) Appl. No.: 15/780,335

(22) PCT Filed: Dec. 8, 2016

(86) PCT No.: PCT/IB2016/057429
§ 371 (c)(1),
(2) Date: May 31, 2018

(87) PCT Pub. No.: WO2017/098427
PCT Pub. Date: Jun. 15, 2017

(65) Prior Publication Data
US 2018/0354014 A1    Dec. 13, 2018

(30) Foreign Application Priority Data

Dec. 9, 2015 (WO) .................. PCT/IB2015/059479

(51) Int. Cl.
*B21D 22/02* (2006.01)
*B62D 25/02* (2006.01)
(Continued)

(52) U.S. Cl.
CPC .......... *B21D 22/022* (2013.01); *B21D 47/01* (2013.01); *B23K 26/28* (2013.01); *B62D 25/02* (2013.01); *B62D 25/04* (2013.01); *B62D 65/02* (2013.01)

(58) Field of Classification Search
CPC .............................. B21D 22/022; B21D 47/01
(Continued)

(56) References Cited

U.S. PATENT DOCUMENTS

2011/0233970 A1    9/2011  Shigeyuki et al.
2011/0248527 A1   10/2011  Ono
(Continued)

FOREIGN PATENT DOCUMENTS

CN        103906674 A      7/2014
CN        104512473 A  *   4/2015
(Continued)

OTHER PUBLICATIONS

The International Search Report issued in connection with International Application No. PCT/IB2016/057429 dated Mar. 13, 2017.
(Continued)

*Primary Examiner* — Weiping Zhu

(57) ABSTRACT

A method for producing an inner automotive structural part containing localized reinforced areas, the method containing the steps of:
  providing an inner upper front pillar blank, an inner center pillar blank and an inner side rail blank,
  hot stamping the inner upper front pillar blank,
  hot stamping the inner center pillar blank,
  hot stamping the inner side rail blank,
wherein, the method contains, prior to the hot stamping steps, the steps of:
  attaching an inner upper front pillar reinforcement blank to a part of the inner upper front pillar blank, said inner upper front pillar reinforcement blank being hot stamped together with the inner upper front pillar blank, (Continued)

attaching an inner center pillar reinforcement blank to a part of the inner center pillar blank, said inner center pillar reinforcement blank being hot stamped together with the inner center pillar blank.

11 Claims, 3 Drawing Sheets

(51) Int. Cl.
    *B62D 25/04*     (2006.01)
    *B21D 47/01*     (2006.01)
    *B23K 26/28*     (2014.01)
    *B62D 65/02*     (2006.01)

(58) Field of Classification Search
    USPC .......................................................... 148/525
    See application file for complete search history.

(56) References Cited

U.S. PATENT DOCUMENTS

| | | | |
|---|---|---|---|
| 2012/0216920 | A1 | 8/2012 | Nam et al. |
| 2014/0147693 | A1 | 5/2014 | Yasuyama et al. |
| 2014/0319877 | A1* | 10/2014 | Hida .................... B62D 25/025 296/191 |
| 2016/0145704 | A1 | 5/2016 | Kawasaki et al. |
| 2017/0247071 | A1* | 8/2017 | Schneider .............. B62D 25/02 |

FOREIGN PATENT DOCUMENTS

| | | |
|---|---|---|
| CN | 104512473 A | 4/2015 |
| EP | 2420432 A1 | 2/2012 |
| EP | 2535242 A1 | 12/2012 |
| EP | 2733051 A1 | 5/2014 |
| JP | 2011088484 A | 5/2011 |
| JP | 2011195110 A | 10/2011 |
| JP | 2013501631 A | 1/2013 |
| JP | 2013184221 A | 9/2013 |
| WO | WO2012036262 A1 | 3/2012 |
| WO | WO2015041159 A1 | 3/2015 |

OTHER PUBLICATIONS

The International Search Report issued in connection with International Application No. PCT/IB2015/059479 dated Aug. 31, 2016.

\* cited by examiner

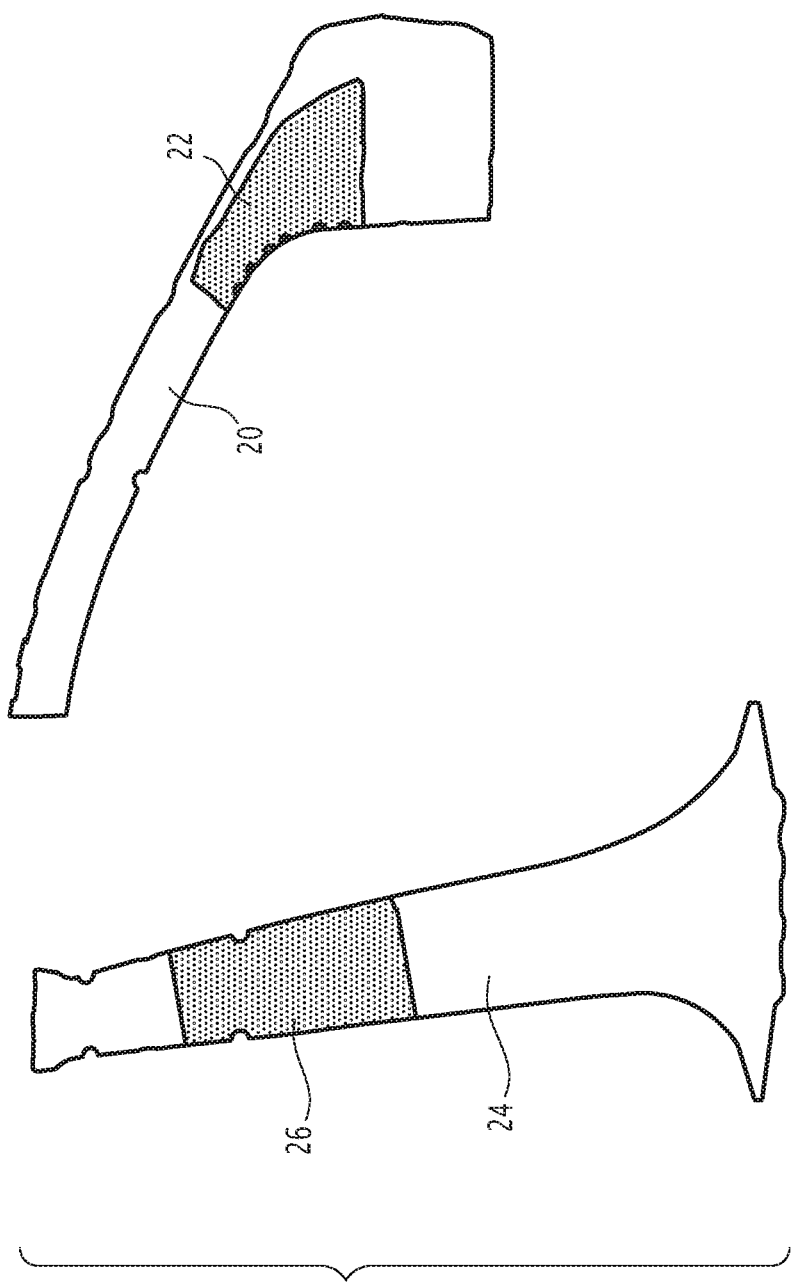

METHOD FOR PRODUCING AN INNER AUTOMOTIVE STRUCTURAL PART COMPRISING LOCALIZED REINFORCED AREAS

FIELD OF THE INVENTION

The invention relates to a method for producing an inner automotive structural part of the type comprising an inner upper front pillar, an inner center pillar and an inner side rail extending between the inner upper front pillar and an upper end of the inner center pillar, said method comprising the steps of:
providing an inner upper front pillar blank, an inner center pillar blank and an inner side rail blank,
hot stamping the inner upper front pillar blank to form the inner upper front pillar,
hot stamping the inner center pillar blank to form the inner center pillar,
hot stamping the inner side rail blank to form the inner side rail,
assembling the inner upper front pillar and the inner center pillar to the inner side rail to obtain the inner automotive structural part.

The invention also relates to a method for producing an automotive structural part with such an inner automotive structural part.

Such an inner automotive structural part, which forms the upper door ring part of an automotive vehicle has to have particular mechanical properties in order to be able to protect the passengers of the automotive vehicle against intrusions of any kind inside the passenger compartment.

The upper door ring part is more particularly arranged to prevent the intrusion of the roof of the vehicle in the passenger compartment, or roof crush, in case of a rollover accident.

BACKGROUND OF THE INVENTION

It is known to reinforce the center pillar and the upper front pillar with reinforcement elements in order to prevent these pillars to bend in case of a rollover accident, which would cause the roof crush. The reinforcement elements are, for example, attached to parts of the center pillar and of the upper front pillar in the form of patches having a complementary shape of the part of the center pillar and of the upper front pillar to which the reinforcement elements have to be attached.

The reinforcement element therefore has to be put into shape; for example during a cold stamping step and then be attached to the complementary area of the pillar that has to be reinforced. However, the small dimensions of the reinforcement element make it hard to manipulate through the stamping process and through the attaching step. The production of the reinforced structural part is therefore not optimized.

Another solution would be to directly provide a reinforced blank, having a localized thicker area in the area to be reinforced, and then to shape the blank into the pillar.

However, this solution is also not satisfactory in that a different blank has to be provided for each automotive vehicle model depending on the location of the reinforced area and on the requirements for said model, for example in terms of dimensions of the reinforced area.

BRIEF SUMMARY OF THE INVENTION

One of the objects of the invention is to overcome these problems by providing a method for producing a reinforced structural part that can be implemented in a simple manner and which can be easily adapted to several vehicle models.

The present invention provides a method of the aforementioned type, wherein the method comprises, prior the hot stamping steps, the steps of:
attaching an inner upper front pillar reinforcement blank to a localized part of the inner upper front pillar blank, said inner upper front pillar reinforcement blank being hot stamped together with the inner upper front pillar blank such that the inner upper front pillar comprises a localized reinforced area having an increased thickness relative to the inner upper front pillar outside said localized reinforced area,
attaching an inner center pillar reinforcement blank to a localized part of the inner center pillar blank, said inner center pillar reinforcement blank being hot stamped together with the inner center pillar blank such that the inner center pillar comprises a localized reinforced area having an increased thickness relative to the inner center pillar outside said localized reinforced area.

Attaching the reinforcement blank to the pillar part prior the hot stamping step avoids having to manipulate a small part through the hot stamping steps since the reinforcement blanks are hot stamped together with the pillar blanks, which are easier to handle. Furthermore, the reinforcement properties can be modified easily simply by modifying the properties of the reinforcement blanks, without having to modify the pillar blanks. Consequently, the same pillar blanks can be used for various automotive vehicle models having different reinforcement requirements.

In additional embodiments, the vehicle underbody structure comprises one or more of the following features, considered alone or according to any technically possible combination:
the inner upper front pillar blank and the inner side rail blank are made of a single part, said inner upper front pillar and inner side rail blank being hot stamped in a single step together with the inner upper front pillar reinforcement blank;
the inner upper front pillar reinforcement blank and the inner center pillar reinforcement blank are attached to the inner upper front pillar blank and to the inner center pillar blank by a resistance spot welding or laser welding step;
the inner center pillar is attached to the inner side rail by a spot welding or laser welding step;
the inner upper front pillar, the inner center pillar and the inner side rail are each made of a press hardened steel part having a tensile strength greater than 1200 MPa;
the composition of the press hardened steel comprises in % weight:
0.15%≤C≤0.5%, 0.5%≤Mn≤3%, 0.1%≤Si≤1%, 0.005%≤Cr≤1%, Ti≤0.2%, Al≤0.1%, S≤0.05%, P≤0.1%, B≤0.010%, the remainder being iron and unavoidable impurities resulting from the elaboration; or
0.20%≤C≤0.25%, 1.1%≤Mn≤1.4%, 0.15%≤Si≤0.35%, ≤Cr≤0.30%, 0.020%≤Ti≤0.060%, 0.020%≤Al≤0.060%, S≤0.005%, P≤0.025%, 0.002%≤B≤0.004%, the remainder being iron and unavoidable impurities resulting from the elaboration; or
0.24%≤C≤0.38%, 0.40%≤Mn≤3%, 0.10%≤Si≤0.70%, 0.015%≤Al≤0.070%, Cr≤2%, 0.25%≤Ni≤2%, 0.015%≤Ti≤0.10%, Nb≤0.060%, 0.0005%≤B≤0.0040%, 0.003%≤N≤0.010%, S≤0.005%, P≤0.025%, %, the remainder being iron and unavoidable impurities resulting from the elaboration;

the inner upper front pillar blank, the inner center pillar blank, the inner upper front pillar reinforcement blank and the inner center pillar reinforcement blank have a structure consisting essentially of ferrite and perlite before said blanks are hot stamped, the inner upper front pillar and the inner center pillar having a structure consisting of 95% or more of martensite after hot stamping;

the inner upper front pillar blank and the inner center pillar blank have each a thickness substantially comprised between 0.7 and 1.5 mm and the inner upper front pillar reinforcement blank and the inner center pillar reinforcement blank have each a thickness substantially comprised between 0.5 and 1.5 mm;

the inner center pillar reinforcement blank is attached to a central part of the inner center pillar blank, said central part being spaced from the upper end of the inner center pillar blank;

the inner front pillar reinforcement blank is attached to an upper end of the inner front pillar blank. The invention also relates to a method for producing an automotive structural part, comprising an upper front pillar, a center pillar and a side rail extending between an upper end of the upper front pillar and an upper end of the center pillar, said method comprising the steps of:

producing an inner automotive structural part as described above, producing an outer automotive structural part by attaching an outer upper front pillar and an outer center pillar to an outer side rail, attaching the inner automotive structural part to the outer automotive structural part to form the automotive structural part.

In certain embodiments, the outer automotive structural part has a concave cross-section, the inner automotive structural part being arranged to close the cavity of the outer automotive structural part.

BRIEF DESCRIPTION OF THE DRAWINGS

Other aspects and advantages of the invention will appear upon reading the following description, given by way of example and made in reference to the appended drawings, wherein:

FIG. 3 is a front view of the blanks used in the method according to the invention.

DETAILED DESCRIPTION OF THE INVENTION

Figure 1:
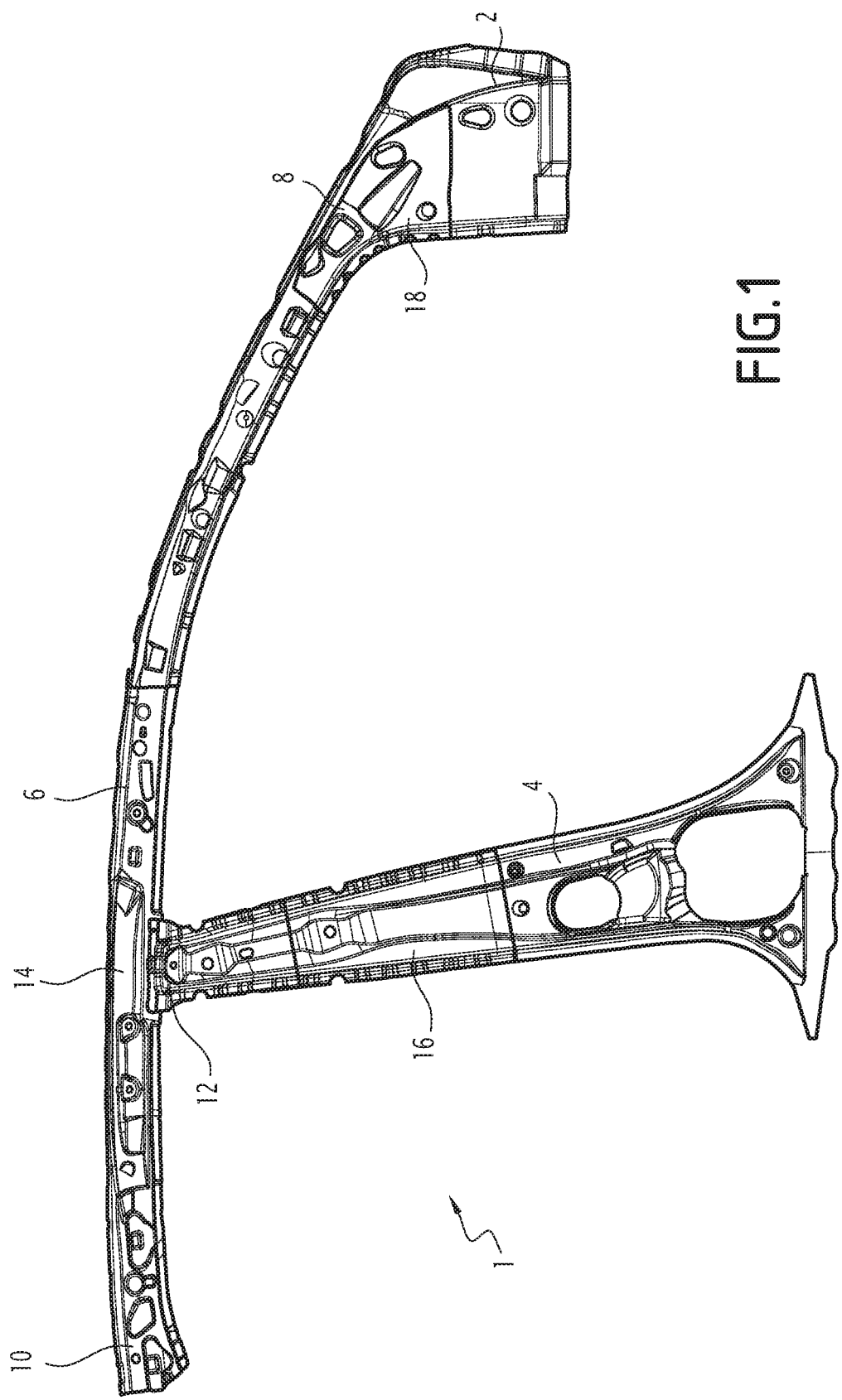
FIG. 1 is a front view of an inner automotive structural part obtained by a method according to the invention.
Figure 2:
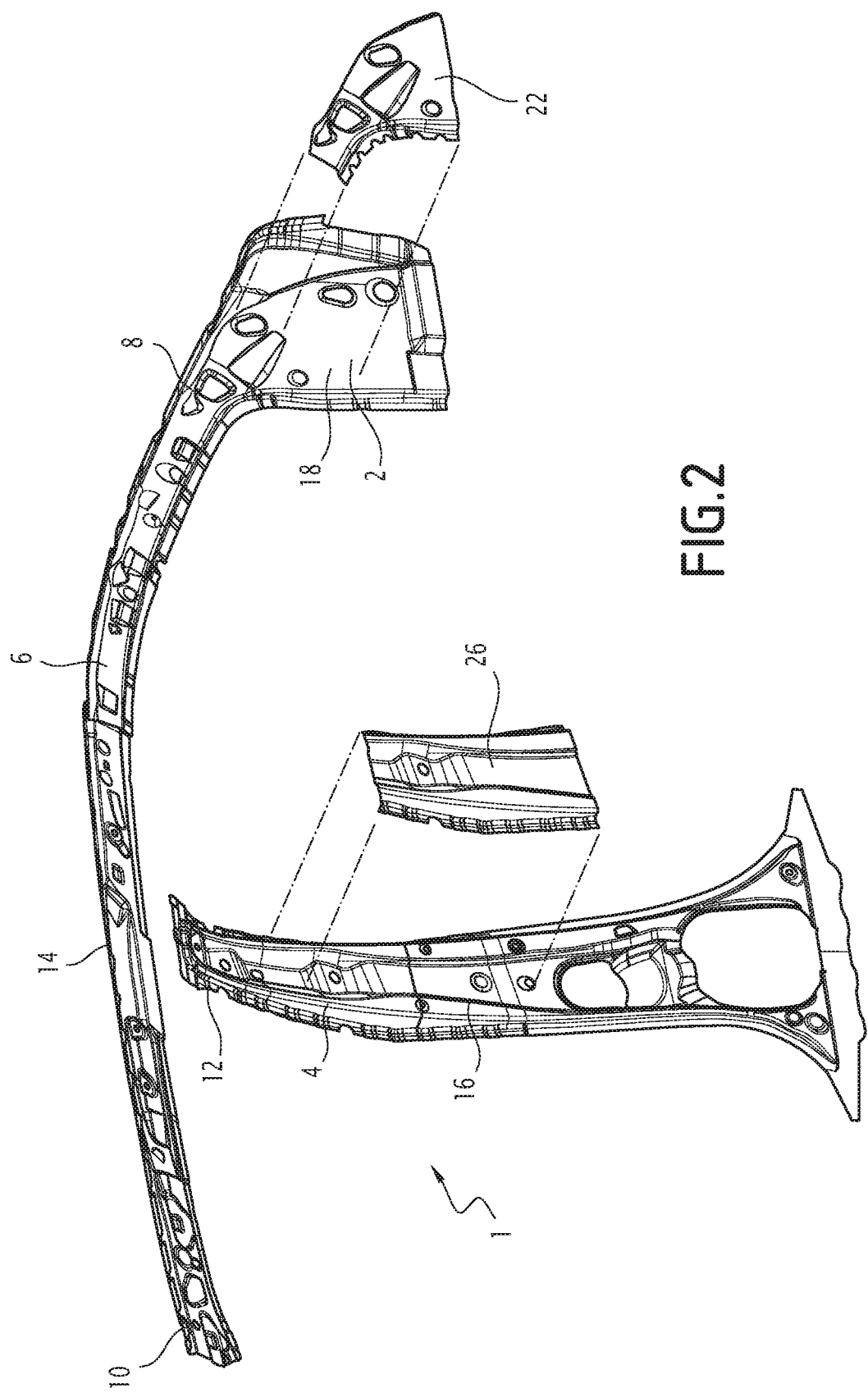
FIG. 2 is a perspective exploded view of the inner structural part of the FIG. 1.

The invention relates to a method for producing an inner automotive structural part 1 comprising an inner upper front pillar 2, an inner center pillar 4 and an inner side rail 6.

Such an inner automotive structural part 1 is intended to form, with a complementary outer automotive structural part, an automotive structural part forming the upper part of a door ring arranged to surround and receive a front door of an automotive vehicle.

The terms "inner" and "outer" are defined relative to the interior and to the exterior of an automotive vehicle. "Inner" defines what is turned toward the interior of the vehicle and "outer" defines what is turned toward the exterior of the vehicle. The terms "lower" and "upper" are defined relative to the elevation direction of an automotive vehicle in regular use condition.

As known, the upper front pillar extends in the elevation direction of the vehicle and is intended to be attached to the lower front pillar to form the front pillar of the vehicle, also known as the A-pillar. The center pillar, also known as the B-pillar, extends in the elevation direction of the vehicle and is intended to receive the locking means of a door of the vehicle and to extend between the front door and the rear door in the case of a five doors vehicle. The center pillar extends substantially along the whole height of the passenger compartment. The side rail extends in the rear-front direction of the vehicle, or longitudinal direction, between a front longitudinal end 8 and a rear longitudinal end 10. The side rail joins the upper front pillar and the center pillar and is intended to support the roof panel of the vehicle.

The inner upper front pillar 2 and the inner side rail 6 are for example made of a single part and the upper end 12 of the inner center pillar 4 is attached to the inner side rail 6, for example to a central part 14 of the inner side rail 6. The central part 14 extends between the front longitudinal end 8 and the rear longitudinal end 10. According this embodiment, the inner side rail 6 can extend substantially along the whole length of the passenger compartment such that the rear longitudinal end 10 is attached to a rear pillar of the vehicle (not shown). Alternatively, the inner center pillar 4 can be attached to the rear longitudinal end 10 of the inner side rail 6.

The inner upper front pillar 2, the inner side rail 6 and the inner center pillar are made of a press hardened steel part having a tensile strength greater than 1200 MPa, for example greater than 1300 MPa. The press hardened steel part presents a martensitic structure. Such high mechanical characteristics make it a suitable part for forming a reinforcement structure such as the door ring.

The composition of such steel may comprise for example, in % weight: $0.15\% \leq C \leq 0.5\%$, $0.5\% \leq Mn \leq 3\%$, $0.1\% \leq Si \leq 1\%$, $0.005\% \leq Cr \leq 1\%$, $Ti \leq 0.2\%$, $Al \leq 0.1\%$, $S \leq 0.05\%$, $P \leq 0.1\%$, $B \leq 0.010\%$, the remainder being iron and unavoidable impurities resulting from the elaboration.

According another preferred embodiment, the steel composition comprises for example, in % weight: $0.20\% \leq C \leq 0.25\%$, $1.1\% \leq Mn \leq 1.4\%$, $0.15\% \leq Si \leq 0.35\%$, $\leq Cr \leq 0.30\%$, $0.020\% \leq Ti \leq 0.060\%$, $0.020\% \leq Al \leq 0.060\%$, $S \leq 0.005\%$, $P \leq 0.025\%$, $0.002\% \leq B \leq 0.004\%$, the remainder being iron and unavoidable impurities resulting from the elaboration. With this composition range, the tensile strength of the press hardened part is comprised between 1300 and 1650 MPa.

According another preferred embodiment, the steel composition comprises for example, in % weight: $0.24\% \leq C \leq 0.38\%$, $0.40\% \leq Mn \leq 3\%$, $0.10\% \leq Si \leq 0.70\%$, $0.015\% \leq Al \leq 0.070\%$, $Cr \leq 2\%$, $0.25\% \leq Ni \leq 2\%$, $0.015\% \leq Ti \leq 0.10\%$, $Nb \leq 0.060\%$, $0.0005\% \leq B \leq 0.0040\%$, $0.003\% \leq N \leq 0.010\%$, $S \leq 0.005\%$, $P \leq 0.025\%$, %, the remainder being iron and unavoidable impurities resulting from the elaboration. With this composition range, the tensile strength of the press hardened part is higher than 1800 MPa.

The steel may be uncoated or coated, for example galvannealed or galvanized by any suitable process such as hot dip coating, electrodeposition, vacuum coating.

The inner upper front pillar 2 and the inner center pillar 4 each comprise a localized reinforced area 16 and 18. The reinforced areas 16 and 18 present an increased thickness, which is greater than the thickness of the rest of the pillars, i.e. the thickness of the pillars outside the reinforced areas 16 and 18. For example, the inner upper front pillar 2 and the inner center pillar present a thickness substantially comprised between 0.7 and 1.5 mm outside the reinforced areas 16 and 18 and a thickness substantially comprised between 1.2 and 3 mm in the reinforced areas 16 and 18.

By localized, it is meant that the reinforcement areas 16 and 18 do not extend over the whole surface of the inner upper front pillar 2 and the inner center pillar 4.

The reinforced area 16 of the inner upper front pillar 2 extends in the upper end of the inner upper front pillar 2, i.e. at the junction between the inner upper front pillar 2 and the inner side rail 6. The reinforced area 18 of the inner center pillar 4 extends in a central area of the central pillar, i.e. in an area spaced from the lower end and the upper end 12 of the inner central pillar 4. More particularly, in a mounted vehicle with the door closed, the reinforced areas 16 and 18 extend substantially opposite the base of the window of the front door of the vehicle, on either side of said window. Consequently, the reinforced areas 16 and 18 extend substantially at the same height in the elevation direction of the vehicle.

Such localized reinforced areas allow the door rings of the vehicle to sustain a rollover accident without the roof penetrating in the passenger compartment, while allowing the major part of the door ring to have a reduced thickness, corresponding to the thickness of the pillar outside the reinforced areas. Consequently, the automotive structural part can be light while having satisfactory mechanical properties.

The method for producing the inner automotive structural part 1 will now be described.

As shown in FIG. 3, a blank 20 for forming the inner upper front pillar 2 is provided. According to the embodiment shown in FIG. 3, this inner upper front pillar blank 20 comprises a part forming an inner side rail blank for forming the inner side rail 6. In other words, the inner upper front pillar blank 20 and the inner side rail blank are formed of a single blank.

The blank 20 is substantially planar and is for example cut from a steel sheet to have the appropriate contour and dimensions to form the inner front pillar and side rail after hot stamping. The steel sheet has a structure consisting essentially of ferrite and perlite arranged such that the inner upper front pillar and side rail will have a structure consisting of 95% or more of martensite after hot stamping.

The thickness of the blank 20 is equal to the thickness of the inner front pillar 2 and of the inner side rail 6 outside the reinforced area 16.

An inner upper front pillar reinforcement blank 22 is also provided, for example by cutting the blank 22 from a steel sheet of the same material as the inner front pillar reinforcement blank 20. The inner upper front pillar reinforcement blank 22 has a contour and dimensions adapted to form the reinforced area 16 when assembled and hot stamped with the inner upper front pillar blank 20. Consequently, the inner upper front pillar reinforcement blank 22 has a thickness equal to the thickness difference between the thickness of the reinforced area 16 and the thickness of the inner upper front pillar blank 20. The inner upper front pillar reinforcement blank 22 has therefore a thickness substantially comprised between 0.5 and 1.5 mm.

The contour of the inner upper front pillar reinforcement blank 22 is the same as the contour of the part of the inner upper front pillar reinforcement blank 20 where the reinforced area 16 is to extend.

The inner upper front pillar reinforcement blank 22 is attached to the inner upper front pillar blank 20 at the location where the reinforced area 16 is to extend, i.e. at an upper end of the inner upper front pillar blank 20, as shown in FIG. 3. The inner upper front pillar reinforcement blank 22 is for example spot welded or laser welded to the inner front pillar blank 20.

The obtained assembled blank is then hot stamped to acquire the shape of the inner front pillar 2 and of the inner side rail 6.

For forming the inner center pillar 4, an inner center pillar blank 24 is provided.

The inner center pillar blank 24 is substantially planar and is for example cut from a steel sheet to have the appropriate contour and dimensions to form the inner center pillar after hot stamping. The steel sheet has a structure consisting essentially of ferrite and perlite arranged such that the inner upper front pillar and side rail will have a structure consisting of 95% or more of martensite after hot stamping.

The thickness of the blank 24 is equal to the thickness of the inner center pillar 4 outside the reinforced area 18.

An inner center pillar reinforcement blank 26 is also provided, for example by cutting the blank 26 from a steel sheet of the same material as the inner center pillar reinforcement blank 24. The inner center pillar reinforcement blank 26 has a contour and dimensions adapted to form the reinforced area 18 when assembled and hot stamped with the inner center pillar blank 24. Consequently, the inner center pillar reinforcement blank 26 has a thickness equal to the thickness difference between the thickness of the reinforced area 18 and the thickness of the inner center pillar blank 20. The inner center pillar reinforcement blank 24 has therefore a thickness substantially comprised between 0.5 and 1.5 mm>.

The contour of the inner center pillar reinforcement blank 24 is the same as the contour of the part of the inner center pillar reinforcement blank 24 where the reinforced area 18 is to extend.

The inner center pillar reinforcement blank 26 is attached to the inner center pillar blank 24 at the location where the reinforced area 18 is to extend, i.e. in a central part of the inner center pillar blank 24, as shown in FIG. 3. The inner center pillar reinforcement blank 26 is for example spot welded or laser welded to the inner center pillar blank 24.

The obtained assembled blank is then hot stamped to acquire the shape of the inner center pillar 4.

The inner center pillar 4 is then attached to the inner side rail 6 for example by resistance spot welding or laser welding to form the inner automotive structural part described previously.

Attaching the inner front pillar reinforcement blank 22 and the inner center pillar reinforcement blank 26 respectively to the inner front pillar blank 20 and to the inner center pillar blank 24 before the hot stamping steps eases the manipulation of the blanks during said hot stamping steps.

It should be noted that the material of the reinforcement blanks 22 and 26 could be different from the material of the pillar blanks 20 and 24, depending on the wanted mechanical properties of the reinforced areas 16 and 18.

Furthermore, modifying the mechanical properties of the reinforced areas 16 and 18 can be easily obtained simply by changing the reinforcement blanks 22 and 26. Consequently, the same pillar blanks 20 and 24 can be used for various vehicle models by changing the reinforcement blanks 22 and 26 to adapt the properties of the reinforced areas 16 and 18.

The obtained inner automotive structural part 1 can then be assembled with an outer automotive structural part to form the automotive structural part. Such an outer automotive structural part comprise an outer upper front pillar, an outer center pillar and an outer side rail and can be produced by a method similar to the method described above. The outer structural part for example has a concave cross-section such as a U shape opened toward the interior of the vehicle. The inner automotive structural part 1 is adapted to close the cavity of the outer automotive structural part.

The obtained automotive structural part is both light and particularly robust, in particular to prevent roof crush in case of a rollover accident.

The invention claimed is:

1. A method for producing an inner automotive structural part of a vehicle comprising an inner upper front pillar, an inner center pillar and an inner side rail extending between the inner upper front pillar and an upper end of the inner center pillar, said method comprising the steps of:
   providing an inner upper front pillar blank, an inner center pillar blank and an inner side rail blank,
   hot stamping the inner upper front pillar blank to form the inner upper front pillar,
   hot stamping the inner center pillar blank to form the inner center pillar,
   hot stamping the inner side rail blank to form the inner side rail,
   assembling the inner upper front pillar and the inner center pillar to the inner side rail to obtain the inner automotive structural part,
   wherein the method comprises, prior the hot stamping steps, the steps of:
   attaching an inner upper front pillar reinforcement blank to a localized part of the inner upper front pillar blank, said inner upper front pillar reinforcement blank being hot stamped together with the inner upper front pillar blank such that the inner upper front pillar comprises a localized reinforced area having an increased thickness relative to the inner upper front pillar outside said localized reinforced area,
   attaching an inner center pillar reinforcement blank to a localized part of the inner center pillar blank, said inner center pillar reinforcement blank being hot stamped together with the inner center pillar blank such that the inner center pillar comprises a localized reinforced area having an increased thickness relative to the inner center pillar outside said localized reinforced area,
   a shape of the inner center pillar reinforcement blank and a shape of the inner center pillar blank corresponding to each other in the localized reinforced area after hot stamping,
   the inner center pillar reinforcement blank being attached to a central part of the inner center pillar blank, said central part being spaced from an upper end of the inner center pillar blank, the inner front pillar reinforcement blank being attached to an upper end of the inner front pillar blank, the localized reinforced area of the inner center pillar and the localized reinforced area of the inner front pillar extending at a same height in an elevation direction of the vehicle.

2. The method according to claim 1, wherein the inner upper front pillar blank and the inner side rail blank are made of a single part, said inner upper front pillar and inner side rail blank being hot stamped in a single step together with the inner upper front pillar reinforcement blank.

3. The method according to claim 1, wherein the inner upper front pillar reinforcement blank and the inner center pillar reinforcement blank are attached to the inner upper front pillar blank and to the inner center pillar blank by a resistance spot welding or laser welding step.

4. The method according to claim 1, wherein the inner center pillar is attached to the inner side rail by a laser welding step.

5. The method according to claim 1, wherein the inner upper front pillar, the inner center pillar and the inner side rail are each made of a press hardened steel part having a tensile strength greater than 1200 MPa.

6. The method according to claim 4, wherein the composition of the press hardened steel comprises in % weight:
   $0.15\% \leq C \leq 0.5\%$, $0.5\% \leq Mn \leq 3\%$, $0.1\% \leq Si \leq 1\%$, $0.005\% \leq Cr \leq 1\%$, $Ti \leq 0.2\%$, $Al \leq 0.1\%$, $S \leq 0.05\%$, $P \leq 0.1\%$, $B \leq 0.010\%$, the remainder being iron and unavoidable impurities resulting from the elaboration; or
   $0.20\% \leq C \leq 0.25\%$, $1.1\% \leq Mn \leq 1.4\%$, $0.15\% \leq Si \leq 0.35\%$, $Cr \leq 0.30\%$, $0.020\% \leq Ti \leq 0.060\%$, $0.020\% \leq Al \leq 0.060\%$, $S \leq 0.005\%$, $P \leq 0.025\%$, $0.002\% \leq B \leq 0.004\%$, the remainder being iron and unavoidable impurities resulting from the elaboration; or
   $0.24\% \leq C \leq 0.38\%$, $0.40\% \leq Mn \leq 3\%$, $0.10\% \leq Si \leq 0.70\%$, $0.015\% \leq Al \leq 0.070\%$, $Cr \leq 2\%$, $0.25\% \leq Ni \leq 2\%$, $0.015\% \leq Ti \leq 0.10\%$, $Nb \leq 0.060\%$, $0.0005\% \leq B \leq 0.0040\%$, $0.003\% \leq N \leq 0.010\%$, $S \leq 0.005\%$, $P \leq 0.025\%$, %, the remainder being iron and unavoidable impurities resulting from the elaboration.

7. The method according to claim 1, wherein the inner upper front pillar blank, the inner center pillar blank, the inner upper front pillar reinforcement blank and the inner center pillar reinforcement blank have a structure consisting essentially of ferrite and pearlite before said blanks are hot stamped, the inner upper front pillar and the inner center pillar having a structure including 95% or more of martensite after hot stamping.

8. The method according to claim 1, wherein the inner upper front pillar blank and the inner center pillar blank have each a thickness comprised between 0.7 and 1.5 mm and the inner upper front pillar reinforcement blank and the inner center pillar reinforcement blank have each a thickness comprised between 0.5 and 1.5 mm.

9. A method for producing an inner automotive structural part of a vehicle comprising an inner upper front pillar, an inner center pillar and an inner side rail extending between the inner upper front pillar and an upper end of the inner center pillar, said method comprising the steps of:
   providing an inner upper front pillar blank, an inner center pillar blank and an inner side rail blank,
   hot stamping the inner upper front pillar blank to form the inner upper front pillar,
   hot stamping the inner center pillar blank to form the inner center pillar,
   hot stamping the inner side rail blank to form the inner side rail,
   assembling the inner upper front pillar and the inner center pillar to the inner side rail to obtain the inner automotive structural part,
   wherein the method comprises, prior the hot stamping steps, the steps of:
   attaching an inner upper front pillar reinforcement blank to a localized part of the inner upper front pillar blank, said inner upper front pillar reinforcement blank being hot stamped together with the inner upper front pillar blank such that the inner upper front pillar comprises a localized reinforced area having an increased thickness relative to the inner upper front pillar outside said localized reinforced area,
   attaching an inner center pillar reinforcement blank to a localized part of the inner center pillar blank, said inner center pillar reinforcement blank being hot stamped together with the inner center pillar blank such that the inner center pillar comprises a localized reinforced area having an increased thickness relative to the inner center pillar outside said localized reinforced area, the localized reinforced area of the inner upper front pillar extending in the upper end of the inner upper front pillar at a junction between the inner upper front pillar and the inner side rail, the inner center pillar reinforcement blank being attached to a central part of the inner center pillar blank, said central part being spaced from an upper end of the inner center pillar blank, the inner front pillar reinforcement blank being attached to an upper end of the inner front pillar blank, the localized reinforced area of the inner center pillar and the localized reinforced area of the inner front pillar extending at a same height in an elevation direction of the vehicle.

10. A method for producing an automotive structural part comprising an upper front pillar, a center pillar and a side rail extending between an upper end of the upper front pillar and an upper end of the center pillar, said method comprising the steps of:

producing an inner automotive structural part according to claim 1, producing an outer automotive structural part by attaching an outer upper front pillar and an outer center pillar to an outer side rail, attaching the inner automotive structural part to the outer automotive structural part to form the automotive structural part.

11. The method according to claim 10, wherein the outer automotive structural part has a concave cross-section, the inner automotive structural part being arranged to close the cavity of the outer automotive structural part.

* * * * *